A. M. BEAN.
HARNESS HANGER.
APPLICATION FILED JAN. 20, 1919.
1,328,312.
Patented Jan. 20, 1920.
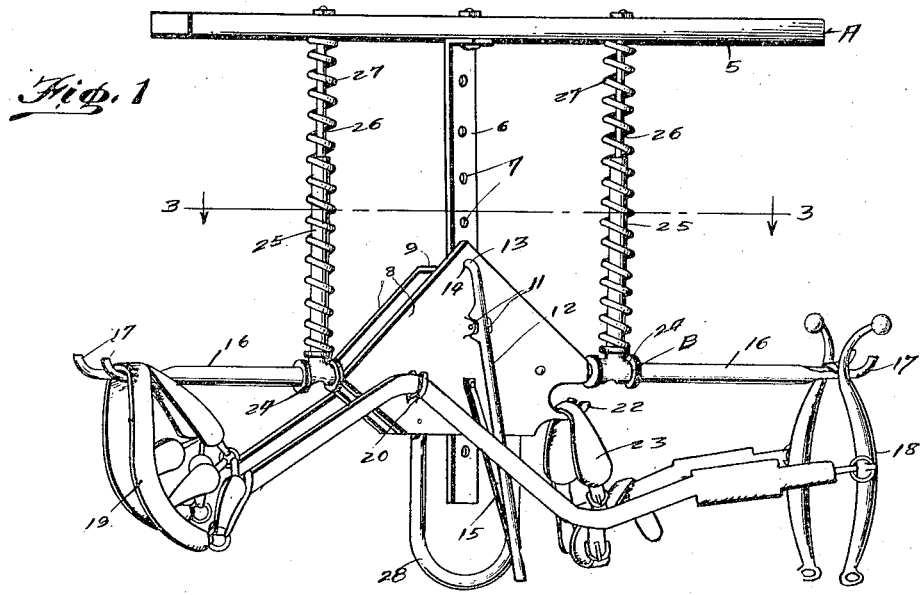
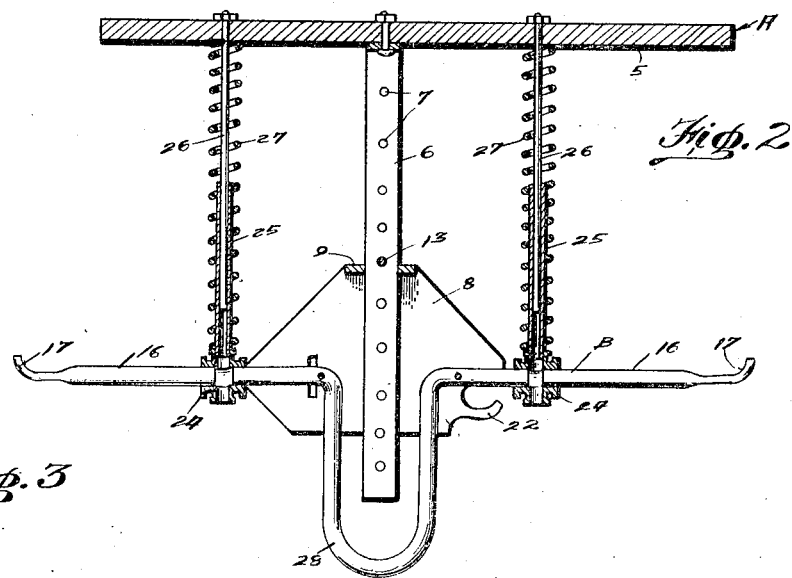
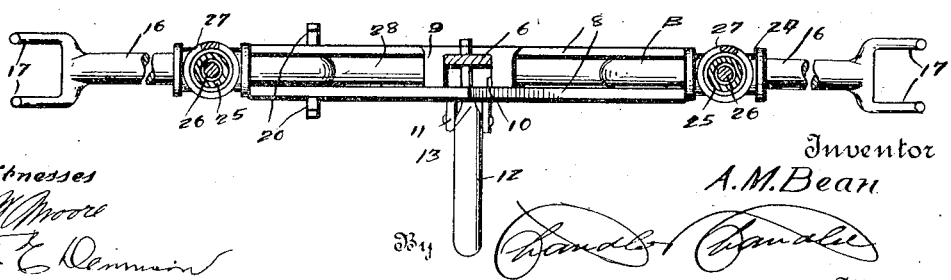
Witnesses
Inventor
A. M. Bean
By
Attorneys

UNITED STATES PATENT OFFICE.

ALBERT M. BEAN, OF COLVILLE, WASHINGTON.

HARNESS-HANGER.

1,328,312.  Specification of Letters Patent.  Patented Jan. 20, 1920.

Application filed January 20, 1919. Serial No. 272,039.

*To all whom it may concern:*

Be it known that I, ALBERT M. BEAN, a citizen of the United States, residing at Colville, in the county of Stevens, State of Washington, have invented certain new and useful Improvements in Harness-Hangers; and I do hereby declare the following to be a full, clear, and exact description of the invention, such as will enable others skilled in the art to which it appertains to make and use the same.

The invention relates to an adjustable harness support, and more particularly to the class of harness hangers, having particular reference to improvements over the subject matter of Letters Patent Number 1,242,125 issued to me on or about the 9th day of October, 1917.

The primary object of the invention is the provision of a hanger of this character, wherein the harness for a draft animal will be suspended in proper position so that it may be lowered in place for the convenient harnessing of the animal without requiring excessive labor on the part of an attendant, or said harness can be removed from the animal and supported in suspended position.

Another object of the invention is, the provision of a hanger of this character wherein, the construction thereof is novel in form so that it may be adjusted to any desired height and lowered, the hanger when in adjusted raised and lowered positions will conveniently support the harness so as to avoid the tangling thereof, bruising or otherwise damaging the same while not in use and also to sustain it in position for the convenient placing thereof upon an animal or its removal therefrom.

A further object of the invention is, the provision of a hanger of this character which is comparatively simple in construction, readily and easily adjusted, thoroughly reliable and efficient in its purpose, neat and attractive in appearance, strong, durable, and inexpensive to manufacture and install.

With these and other objects in view, the invention consists in the features of construction, combination and arrangement of parts as will be hereinafter fully described, illustrated in the accompanying drawing and pointed out in the claims hereunto appended.

In the accompanying drawing:

Figure 1 is a perspective view of the hanger supported in accordance with the invention showing a set of harness carried thereby.

Fig. 2 is a vertical transverse sectional view taken submedially of the hanger.

Fig. 3 is a sectional view on the line 3—3 of Fig. 1, looking in the direction of the arrow.

Similar reference characters indicate corresponding parts throughout the several views in the drawing.

Referring to the drawing in detail, A designates generally a support which is adapted to be fixed over-head and may be a part of a barn or stall, the support being in the form of a beam 5, having fixed thereon a depending vertical guide rod preferably in the form of a flat bar 6 of the required length, and which is provided at intervals centrally longitudinally thereof with a plurality of holes or openings 7 for the adjustable fastening of a harness rack or holder B hereinafter fully described.

The harness rack or holder comprises a combined guide and latch frame including spaced parallel cheek plates 8, preferably of the shape shown in Fig. 1 of the drawing, which are disposed on opposite sides of the guide bar 6, and one of these cheek plates has its uppermost corner portion truncated and bent inwardly at rightangles thereto toward the other cheek plate to constitute a guide flange 9 which is formed with a medial recess or notch 10 for the guide bar 6 which moves therein, while the other cheek plate is formed medially with spaced pivot bearings 11.

Between these pivot bearings and pivoted thereto is a catch lever 12 formed with a latch jaw 13 working through a suitable hole or opening 14 in the adjacent cheek plate 8 for engaging in any one of the holes or openings 7 in the bar 6 for locking the harness holder or rack in adjusted position. On the cheek plate 8 next to the catch lever 12 is a leaf spring 15 which has its free end working against the handle end of the catch lever 12 to hold its jaw 13 in locking position relative to the bar 6, the catch lever 12 being released against the resistance of the spring 15 upon pressing inwardly on the handle end of said lever, as will be obvious.

Arranged in horizontal alinement with each other on opposite sides of the combined guide and latch frame are outwardly extending arms 16, which have their inner ends riveted or otherwise permanently fastened to the cheek plates 8 and are disposed between the same. The outer ends of the arms 16 carry forks or double hooks 17, one of which is adapted to receive the harness 18 or they may receive a collar for the hanging of the same therefrom while the other hooks or fork are adapted to receive the breeching 19 of the harness as well as the back strap, crupper, or the like.

Cut from and bent outwardly from the cheek plates 8 are tug hooks 20 in which are engaged the tugs or tracers 21 of the harness, while cut from the forward portion of the cheek plates 8 below the plane of the arms 16 are back band hooks 22 in which is removably engaged the back band or saddle 23 of the harness, and in this manner the latter is held in proper position upon the harness holder or rack, as is clearly illustrated in Fig. 1 of the drawing.

On the arms 16 of the holder or rack contiguous to the combined guide and latch frame constituted by the cheek plates 8 are pipe unions or couplings 24 in which are fixed the vertical tubular lower guides 25, while fixed in the beam 5 and slidably telescoped in the lower tubular guides 25 are the upper guide rods 26 and surrounding these tubular guides 25 and rods 26 are coiled retractile springs 27 which are fastened at opposite ends in any suitable manner to the beam 5 and the arms 16 of the rack or holder respectively, the springs being designed to tension the rack or holder for drawing it upwardly when the catch lever 12 is released, yet the holder or rack can be pulled downwardly to lowered position against the resistance of said springs 27 when the harness is to be placed upon an animal.

Arranged between and suitably fixed to the cheek plates 8 is a depending loop handle 28 so that the hand of the operator engages therewith when it is desired to lower the rack or holder, the catch lever 12 being of a length to extend in bridging relation to the handle 28 and medially thereof, so that the hand of the operator can readily grasp the same for releasing the catch lever when it is desired to lower the holder or rack, or when the occasion requires that the said rack or holder be elevated, as will be obvious.

What is claimed is:

1. A harness hanger comprising an overhead support having a guide member, a combined guide and latch frame slidably fitted upon the guide member, arms mounted in the frame and extending outwardly therefrom in a horizontal plane in alinement with each other and having forked ends, telescoping guide members carried by the support and the arms, and means carried by the frame for engaging the first named guide member to lock the frame in adjusted position.

2. A harness hanger comprising an overhead support having a guide member, a combined guide and latch frame slidably fitted upon the guide member, arms mounted in the frame and extended outwardly therefrom in a horizontal plane in alinement with each other and having forked ends, telescoping guide members carried by the support and the arms, means carried by the frame for engaging the first named guide member to lock the frame in adjusted position, and resilient tensioning means surrounding the last named guide members and fixed to the support and arms respectively for automatically elevating the frame upon the first named guide member when said frame is released.

3. A harness hanger comprising an overhead support having a guide member, a combined guide and latch frame slidably fitted upon the guide member, arms mounted in the frame and extending outwardly therefrom in a horizontal plane in alinement with each other and having forked ends, telescoping guide members carried by the support and the arms, means carried by the frame for engaging the first named guide member to lock the frame in adjusted position, resilient tensioning means surrounding the last named guide members and fixed to the support and arms respectively for automatically elevating the frame upon the first named guide member when said frame is released, and a depending handle carried by the frame.

In testimony whereof, I affix my signature, in the presence of two witnesses.

ALBERT M. BEAN.

Witnesses:
THOMAS F. LINGO,
C. E. CURTIS.